Jan. 22, 1935.  K. R. SHAW  1,989,066
CORDAGE
Filed May 25, 1933  4 Sheets-Sheet 1

INVENTOR:
Kenneth R. Shaw,
BY
his ATTORNEY.

Jan. 22, 1935.　　　　K. R. SHAW　　　　1,989,066
CORDAGE
Filed May 25, 1933　　4 Sheets-Sheet 2

Jan. 22, 1935.　　　　K. R. SHAW　　　　1,989,066
CORDAGE
Filed May 25, 1933　　　4 Sheets-Sheet 4

Patented Jan. 22, 1935

1,989,066

UNITED STATES PATENT OFFICE 1,989,066

CORDAGE

Kenneth R. Shaw, Easthampton, Mass., assignor to United Elastic Corporation, Easthampton, Mass., a corporation of Massachusetts Application May 25, 1933, Serial No. 672,859

28 Claims. (Cl. 173—367)

This invention relates to cordage and to methods of making cords, ropes, electrical conductors, and other articles of cordage.

In using cords or ropes of the smaller sizes, the matter of handling the slack or loose lengths of this material frequently is the cause of much annoyance. This often is the case, for example, with dog leashes, clothes lines, and the like. For such purposes some means for taking up the slack automatically and releasing it when needed is highly desirable. While automatic reels may sometimes be used for this purpose, there are many situations in which they cannot be so used, and which call for a cord that will automatically take up any substantial amount of slack created in it. Such slack or loose cord is especially annoying in the flexible conductors or current carrying cords used with electric flatirons, domestic vacuum cleaners, and other electric appliances, to connect the appliance with an outlet or other source of electric current.

To devise a satisfactory solution for this problem constitutes the chief object of this invention.

The nature of the invention will be readily understood from the following description when read in connection with the accompanying drawings, and the novel features will be particularly pointed out in the appended claims.

Figures 1, 2, 3:
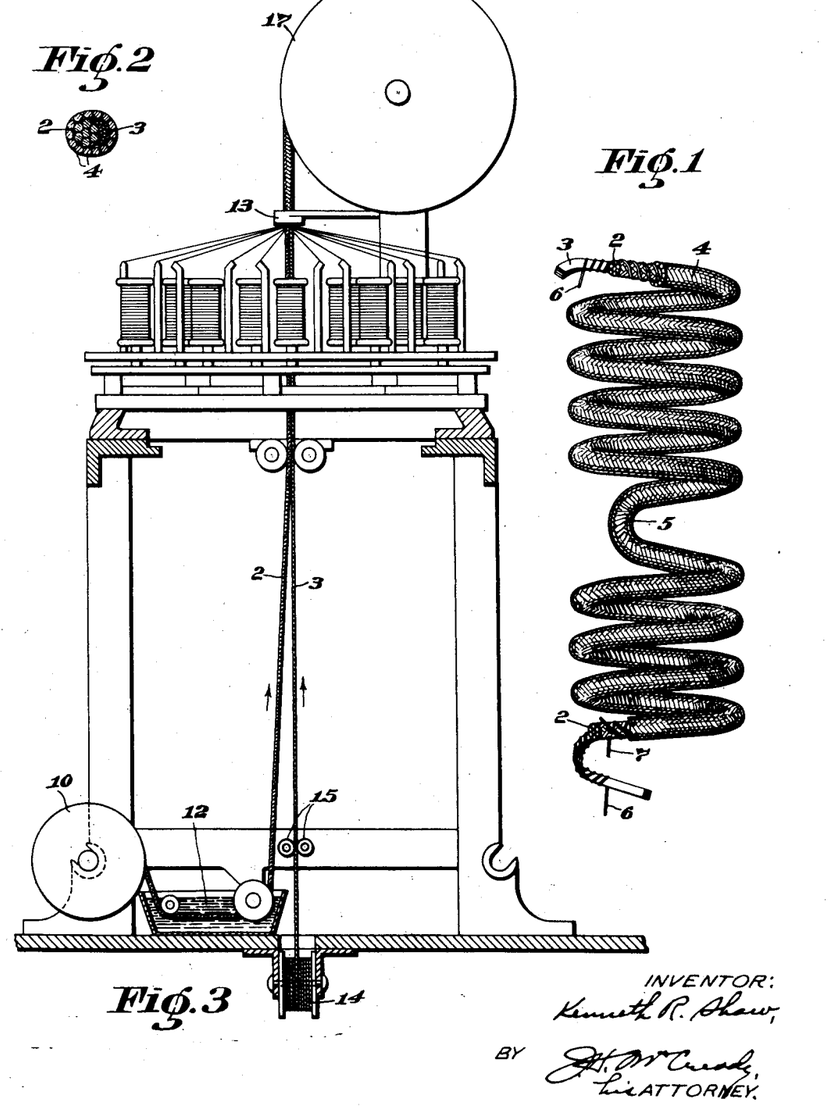
Figure 1 is a side view of a section of cord made in accordance with this invention.
Fig. 2 is a transverse, sectional view on a larger scale of the cord shown in Fig. 1.
Fig. 3 is a diagrammatic view illustrating one method of manufacturing the cord shown in Figs. 1 and 2.

Referring first to Figs. 1 and 2, the cord there shown comprises a central core 2 which may conveniently consist of a braided or twisted cord made in accordance with the usual methods and from the common fibres employed for this purpose, or which may be of a different nature, depending upon the use to be made of the final product. Located immediately beside the core 2 is an elastic cord or strand 3, preferably consisting of several strips of rubber. Both of these elements are enclosed in and closely bound together by a jacket or cover 4 which may be fabricated in any suitable manner, as by braiding. The rubber strand 3 is held in a substantially fixed relationship to the core 2 and has sufficient strength and is under such tension that it normally holds the cord in the helically coiled condition shown in Fig. 1. In other words, the elastic strand extends along the inside of the curves or loops, and, due to its inherent tendency to contract longitudinally, it bends the cord, when allowed to do so, into the helically coiled condition shown. At the same time the elastic strand yields to permit the cord to be pulled into an extended condition. The cord, therefore, is self-contracting in the sense that it returns automatically to a looped and compact condition whenever allowed to do so.

When the cord is stretched there is some tendency for it to kink, and in order to overcome this difficulty I prefer to reverse the direction in which it is coiled at about the middle of the entire length, or if the length is too long then to reverse it at regular intervals so that substantially half of the total cord will be coiled in one direction and the other half in the opposite direction. At each point of reversal of winding, the rubber strand 3 may be shifted around the core about a quarter of a turn so that its tendency to bend the cord is exerted in a different direction. But in the succeeding section of the cord which is reversely wound, the elastic strand, of course, lies on the inside of the turns or coils. At the point of reversal the formation is approximately as illustrated at 5 in Fig. 1, and this point may aptly be termed a "node." With such an arrangement the extension of the cord causes the node 5 to revolve around the axis of the helix as it is straightened out and any tendency of the turns or loops to kink thus is obviated. When the tension applied to the cord to straighten it or extend it is relieved, the node 5 rotates in the opposite direction (if the ends are held against rotation) as the cord contracts.

It should be observed that in this cord the rubber strand 3 holds the cord normally in a looped or coiled condition by virtue of the fact that said strand is located at one side of the neutral axis of bending of the cord. This will be evident from an inspection of Fig. 2. By the "neutral axis of bending of the cord" is meant that axis along which a longitudinally directed force will produce no bending of the cord in any direction. Usually this axis substantially coincides with the longitudinal axis of the cord. Since the rubber strand is located at one side of said neutral axis, its inherent tendency to contract lengthwise operates to bend the cord and the direction in which it is bent will depend upon the position of the elastic strand relatively to said axis. The diameter of the coils, bends or loops produced in this manner will depend upon the relationship between the strength of the elastic strand with reference to the resistance to bending of the composite cord and also upon the distance by which the elastic strand is spaced from the neutral axis of bending. Consequently, by properly controlling these factors considerable variation in the final result can be produced.

The extent to which the elastic strand 3 can contract can also be controlled by winding a covering 6, Fig. 1, of thread or yarn on the rubber strand 3 preparatory to associating this strand with the other elements of the cord. This winding operation is performed with the rubber strand under tension, and the turns of thread 6 are so spaced from each other that when the cord contracts to the desired point, adjacent turns of the thread will bring up against each other in abutting relationship and thus substantially prevent any further contraction of the rubber strand. A rubber strand with a cover wound thereon in this manner is sometimes referred to in the trade as "guimp", or "covered rubber." It is particularly useful in a cord embodying this invention for the reason that the flexibility of such a cord tends to increase with use or, in other words, its resistance to bending decreases with use, while the strength of the rubber usually remains approximately constant under favorable conditions for some years. If, therefore, the contraction of the rubber were not limited, these factors would tend to cause the rubber strand to loop the cord into smaller coils as its flexibility increased. In addition, it has the further advantage of maintaining the rubber strand under an initial tension even when fully contracted and thus affording a better control over the action of the cord.

Such a cord can be manufactured in many ways. For example, the relatively non-elastic core 2 can be laid beside the rubber strand 3 with the latter stretched to the desired degree, and the two may be bound together by winding a thread or yarn around them, such a thread being shown in Fig. 1 at 7. The relative positions of the rubber and core may be shifted, as desired, in order to produce the node 5, and they can conveniently be bound in the desired relationship substantially throughout the entire length of the composite cord. In making short lengths, such for example, as those used in dog leashes where a leather jacket or covering is desirable, the core and rubber strands so bound together can then be dipped in rubber latex, or some other flexible adhesive, and the leather jacket either wound on the composite core structure, or applied in any other suitable manner, the latex serving to bond the jacket securely to the core. Or the assembly consisting of the core and rubber strand could be transferred to a braiding machine and have a thread or yarn jacket there braided on it.

Another method of making this cord which can be performed by making suitable changes in braiding machines of a well known type is illustrated in Fig. 3. As there shown, the supply of core material is brought to the machine wound on a reel 10, and the core is unwound from this reel and led through a bath 12 of latex or other adhesive and thence is guided upwardly through the center of the braiding machine to the die or braiding point 13. The elastic strand may be brought to the machine in the same way and is given a few turns around the delivery roll 14 to keep it from slipping relatively to this roll, after which it is led upwardly between guide rolls 15 and 16, joining the core 2 before the latter reaches the braiding point. At the latter point the jacket 4 is braided around the core structure and the completed cord then runs over the take-up roll 17 and is wound on a suitable reel. When this method is employed the thread 7 is not required since the braid serves to hold the core and the rubber strand in the desired relationship.

In order to apply the desired initial tension to the elastic strand the delivery roll 14 and the take up roll 17 should be positively connected together and driven in a definite ratio to each other so as to apply the desired elongation or stretch to the rubber. In a typical case a 30% stretch is satisfactory, but this factor obviously can be controlled as desired.

In some cases the impregnation of the core with rubber latex or some other adhesive may be undesirable, in which event the dip tank will not be used. For many purposes, however, a more satisfactory product is obtained by using the impregnating step above mentioned, the core taking up a sufficient supply of adhesive to bond the braided threads composing the jacket 4 securely to the core structure.

It is desirable to cut the cord into the desired lengths after the jacket has been braided and to wind each length on a core or form, shifting the rubber in the jacket at the desired point or points to produce the nodes, and reversing the direction of winding at the nodes as above described. This operation should be performed before the latex is completely dried and the cord should be allowed to remain on the form until it is thoroughly dry and has become set.

Figures 4, 5, 6:
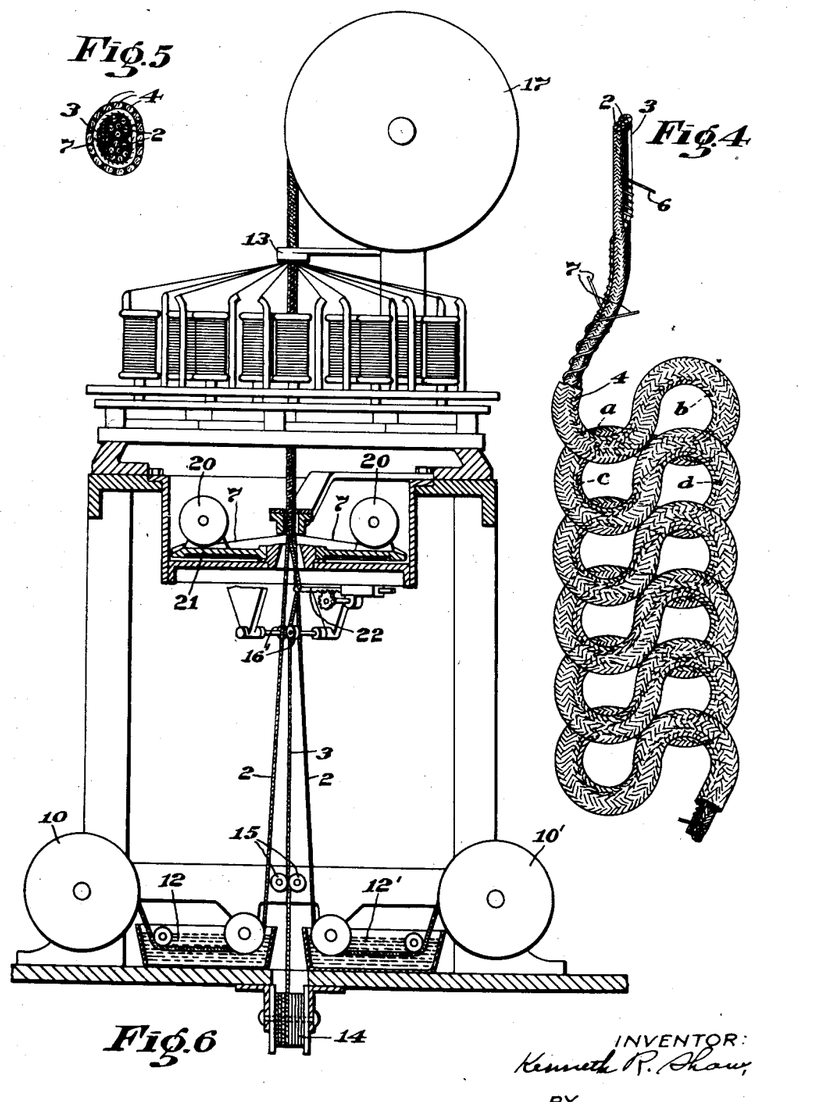
Fig. 4 is a plan view of another cord embodying features of this invention.
Fig. 5 is a transverse, sectional view of the cord shown in Fig. 4.
Fig. 6 is a view similar to Fig. 3 but illustrating a method of making the cord shown in Figs. 4 and 5.

If, instead of maintaining the elastic strand 3 always in the same relationship to the core 2, it should be shifted at regular intervals from one side to the other of the core, then the contraction of the rubber would not bend the cord into a helical form but would make reversely curved and oppositely disposed loops in the cord, as shown in Fig. 4. In other words, the cord would be folded into a series of figure eight loops. In making a cord of this character it is preferable to use two core members, as clearly shown in Figs. 4 and 5, and to shift the rubber strand 3 from one side to the other of these members at regular intervals spaced along the core, the shifting operation being performed by pushing the rubber strand between the core members. These parts may be wound with thread or yarn 7 to hold them in this relationship, and a jacket 4 then braided around the entire assembly. The rubber strand is maintained under tension while it is being associated with the core members 2—2, and it serves, when allowed to contract, to fold the cord in the manner above described. In this cord, as in that shown in Figs. 1 and 2, the elastic strand is spaced from the neutral axis of bending of the composite cord but is shifted at regular intervals from one side to the other of said axis. When it contracts, the lengths of the strand lying at opposite sides of this axis bend the main body of the cord around themselves. This will be readily understood from an inspection of Fig. 4, it being observed that the rubber strand lies at the inside of the curve a, then shifts to the inside of the curve b, shifts again to the inside of the curve c, and so on, the elastic strand being indicated by the dotted lines. This strand, therefore, serves to hold the cord normally in a contracted and folded condition, but permits it to be pulled out into an extended condition, the tension on the elastic strand being increased, of course, as the cord is extended.

A cord of this type may be made in a machine similar to that illustrated in Fig. 3 by modifying it approximately as shown in Fig. 6. Since two core members are used, an additional reel 10' is provided to feed the second core member 2, the other member 2 and the elastic strand 3 being fed in the same manner as in the construction shown in Fig. 3. All three of these elements pass upwardly through the die 13 and have a jacket 4 braided around them in the manner above described. On their way to the braiding point the wrapping threads 7—7 may be wound around the three elements of the composite structure, thus holding the elastic strand 3 in a fixed and desired relationship to the core cords 2—2. The reels 20—20 on which the supply of wrapping thread 7 is carried may be mounted on a revolving carrier 21, driven at a definite ratio to the upward feeding movement of the core members so that the wrapping threads will be wound spirally around the core cords and the elastic strand.

For the purpose of shifting the elastic strand 3 from one side to the other of the core cords 2—2, this strand may be led through a guiding eye formed in the end of a reciprocating rod 22 which is driven by positively operated cam connections with the takeup roll 17, so that the guide will be operated at predetermined times to shift the elastic strand from one side to the other of the core members 2—2, and they will immediately thereafter be bound together in the desired relationship by the wrapping threads 7—7. This wrapping mechanism rarely will be found necessary in a machine organized in the manner illustrated in Fig. 6, since the mechanism for controlling the position of the elastic strand can usually be placed immediately below the die 13, so that the core strands and the elastic strand will be adequately bound together in the desired relationship by the jacket braided around them.

In this connection it may also be pointed out that for manufacturing reasons, and particularly in order better to control the tension on the rubber, it is preferable to divide the process of making the cord shown in Fig. 4 into two distinct operations, one consisting in the assembly of the core elements and the binding of the core strands to the elastic strand in order to hold these strands in the desired relationship to each other, and the second consisting in transferring the assembly so formed to a braiding mechanism, impregnating it, if desired, with some suitable medium and braiding the jacket around it.

As the core cords are drawn from the supply reels 10 and 10', when the cord is made in the machine shown in Fig. 6, they may be led through dip tanks 12 and 12' to impregnate them with rubber latex or any other desired adhesive or impregnating compound. In some cases this impregnating material may consist simply of a waterproofing agent designed to increase the flexibility and weather resistance of the cord. For most purposes, however, I prefer to use rubber latex, or some equivalent rubber preparation as the impregnating medium. Preferably the impregnated cord is taken from the takeup roll 17 while it is still moist, it is cut into suitable lengths, and each length is folded into the desired form according to its natural tendency. In other words, the inherent tendency of the elastic strands to contract longitudinally gives the cord an initial figure eight fold, and the operator accentuates this tendency and folds the cord up into the desired form. It is allowed to dry thoroughly and to become "set" while it is in this condition.

With regard to the initial stretch given to the elastic strand, it may be pointed out that while an average value for the stretch at the time of manufacture is in the neighborhood of 30%, the degree of stretch necessarily will depend upon a number of practical factors, particularly the flexibility of the core, the size of the core strands and of the entire cord, the size of the loops which it is desired to have formed as the cord contracts, and the like. In some cases as little as a 10% stretch on the elastic in the finished product is sufficient, but in other cases the stretch may run up to 80% or 100%, or thereabouts. This factor is also affected to some extent by the shrinkage which the core strands undergo as they dry out after being impregnated.

In some cases where it is desirable to limit definitely the contraction of the elastic strand, it is found that a second covering or winding applied over the first cover and wound in a reverse direction to that of the first cover is of advantage. This is true more particularly in those cases where the core is of a yielding nature so that there is some tendency for fibers or elements of the core to be forced into the spaces between the adjacent turns of the thread or yarn of which the cover on the elastic strand is composed. If this occurs when the elastic strand is stretched, it has the effect of limiting abnormally the return of the elastic strand to its original condition. By winding a second cover around the first and in a reverse direction to the first, the entrance of elements of the core between the turns of the covering is substantially eliminated, and the desired control of the elastic strand is practically ensured.

Figures 8, 9, 10:
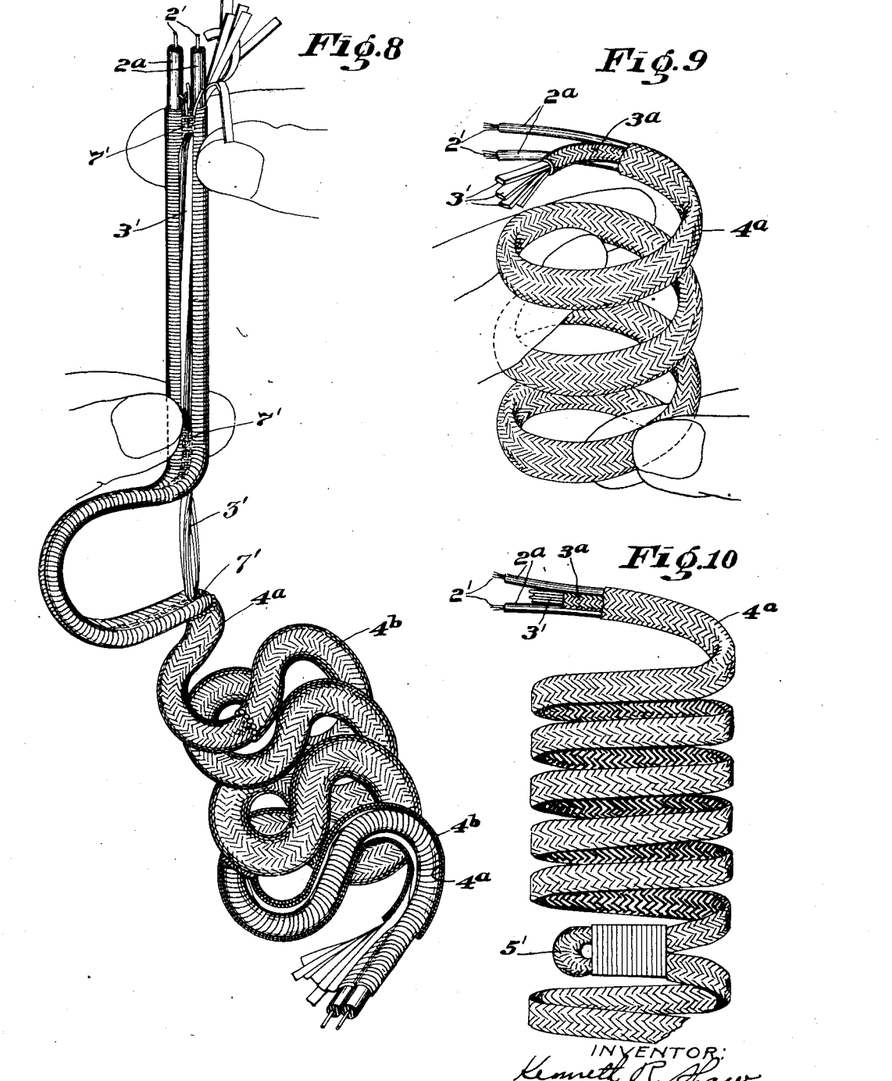
Fig. 8 is a perspective view, partly in section, showing the construction of an electrically conducting cord embodying this invention.
Figs. 9 and 10 are perspective views showing other forms of such electric conducting cords.

The invention finds an especially important application in the electrically conducting cords used in connection with electric flat irons, toasters, vacuum cleaners, and various other electric appliances. Cords suitable for these purposes are illustrated in Figs. 8, 9 and 10. They may be made by substantially the same methods above described and they are substantially like the constructions shown, for example, in Figs. 1 and 4, except that the core in each of these electrically conducting cords consists of one or more wires or other similar conducting elements. In the figures just referred to each of the cores consists of two flexible wires 2', each wire being protected by an insulating covering 2ᵃ of rubber, asbestos, or other suitable insulating material. In some cases, however, a different number of conductors will be used, as for example, in the cords used with telephone sets where three conductors or wires are required in each cord.

The cord shown in Fig. 8 is essentially like that illustrated in Fig. 4 except for the difference above pointed out, the two wires 2' being associated with the rubber cord or strand 3' in the same manner that the core members 2 in Fig. 4 are associated with the rubber strand 3 in that figure. The elastic strand 3' is bound to the wires by a thread 7' which may either extend along the entire length of the cord or may simply bind the elements together at intervals, as shown in Fig. 8, and a flexible jacket or cover 4ª is braided around this entire assembly where it closely encloses the elements and holds them in their cooperative relationship to each other. The step of assembling the two wires and the rubber strand may be performed in a machine such as that illustrated in Fig. 6, in an independent winding machine, or in a loom. In the event that this operation is performed in either of the two last named machines the assembled parts are wound on a beam and subsequently transferred to another machine which braids the jacket 4ª around it. During the assembling operation the rubber cord or strand 3' is maintained under tension for the purposes above described. In Fig. 8 the thumbs and fingers of a person's hands are shown holding the portion of the cord between them in a tensioned and straight condition, but the parts of the cord below the lower thumb and finger are not so tensioned and therefore are held in a looped form by the rubber strand 3'.

Figure 7:
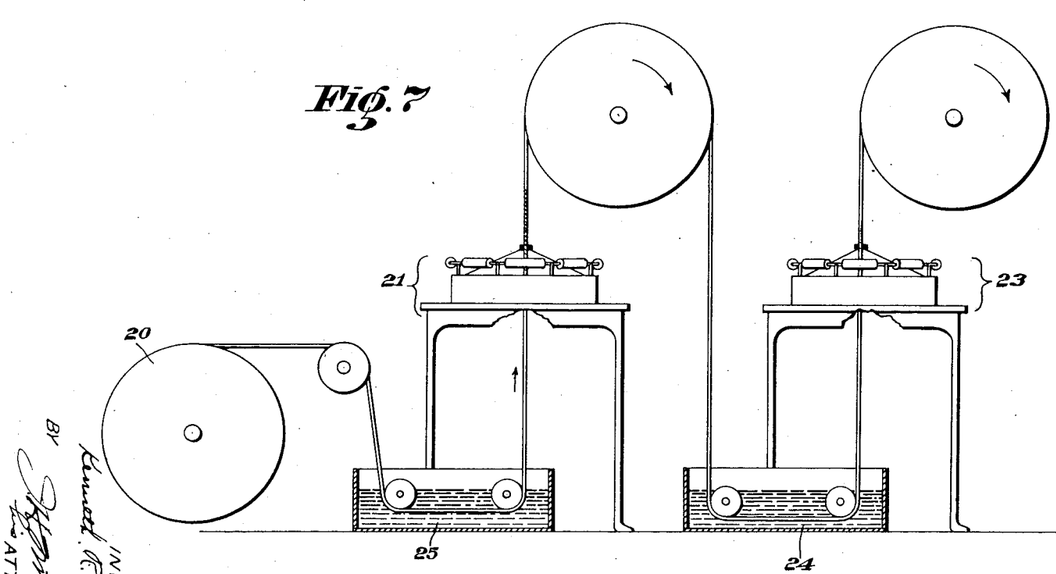
Fig. 7 is a diagrammatic view illustrating a step in one method of manufacture of cordage embodying this invention.

Fig. 7 shows the elements of the cord properly associated and bound together and wound on a drum or "beam" 20 from which the cord is fed to a braiding machine 21 of a common type, which braids the cover 4ª, Fig. 8, around said elements. It is preferable to feed this assembly through a bath 25 of rubber cement, rubber latex, or some other suitable cementing medium so that when the jacket is braided on it the threads of this jacket or covering will be securely united to the insulated wires. In view of the fact that these conducting cords or cables are subjected to rough handling and severe wear, it is usually desirable to braid a second jacket 4b, Fig. 8, around the inner jacket 4ª, and this result may conveniently be accomplished by passing the cord or cable continuously from the first braiding machine 21 through a second braider 23. Preferably, also, the cable passes through a second bath 24 of rubber latex or other suitable adhesive on its way to the second braider so that the two jackets will be adhesively united to each other. After the second covering has been braided on the cord it may then be dried, vulcanized, if desired, covered with talc, or treated in any other convenient manner. It should be observed, however, that the cord is maintained in its extended or stretched condition during the braiding and dipping operations. After these operations have been completed and the tension on the cord is released the elastic strand 3' contracts and draws the cord into a reversely looped or folded condition, as above described. Preferably it is cut into lengths, the folds are accentuated by hand, as above described, and it is allowed to dry and thoroughly set while in this condition.

The manufacture of the self-coiling conducting cords shown in Figs. 9 and 10 will be clearly understood from the earlier description of the non-conducting cord of this type illustrated in Fig. 1. It is often desirable in making both these cords and also the self-folding cords shown in Fig. 8 to cover the rubber elements of the strand 3' so as to limit the degree to which it can contract. In all of these conducting cords the rubber strands are offset from the neutral axis of bending of the cord in the same manner as in the non-conducting cords illustrated in Figs. 1 and 4. A greater quantity of rubber, however, is usually required in these cords than in the non-conducting type because of the fact that the wire elements of the core are usually not as flexible as are the cores of the non-conducting cords. The self-coiling cord should be wound in reversely disposed lengths, as above described, connected by a node, such as that shown at 5 in Fig. 4, or 5' in Fig. 10, in order to avoid connecting.

The braided jacket or jackets of this cord are useful in limiting the amount of contraction of the cord and the radii of the loops formed in it by the longitudinal contraction of the elastic strand, and the composition of the cement or adhesive with which the jacket is impregnated will be determined to some extent by this consideration. Where greater stiffness in the jacket is desired, relatively hard adhesives, such as water glass or hard glues, and the like, or suitable fillers may be introduced in the impregnating baths to afford the desired degree of control of bending.

Cords of the construction above described, whether conducting or non-conducting, tend constantly, when stretched, to contract, but the elastic elements of the cord are so associated with the core members and other parts of the cord that this tendency is fairly uniform and need not be sufficiently strong to offer any undue resistance to the movements of the article connected to it. For example, in the case of a conducting cord, the degree of elasticity can readily be made such that the cord will automatically take up any substantial amount of slack while still having such an easy stretch that it does not offer any substantial resistance to the normal movements of a flatiron, vacuum cleaner, or other appliance to which it is attached. The invention therefore avoids the common objections to the usual conducting cords and other types of cordage falling into loose loops which get in the way and are a source of annoyance. In other words, the invention provides a cord which is self-contracting or self-folding and which, therefore, automatically takes up any substantial amount of slack formed in it.

For convenience the term "cord" will be used in the claims in a generic sense to include articles of the kind commonly referred to by the terms "cords", "ropes", and the like. Also, while the core and elastic member are of such a character that they may commonly be called cords, they will, in the interests of clearness, be designated in the claims as a "core" and an "elastic strand", respectively, it being understood that the core may be made of several cords or strands, and that the elastic strand may also consist of several elements or strands. In some of the more limited claims the "core" may be defined more specifically.

While I have herein shown and described typical embodiments of my invention, it will be evident that the method or process may be practiced by hand or with the aid of a great variety of different forms of apparatus and that the invention may be embodied in other forms without departing from the spirit or scope thereof. For example, other cord-like elements, such as closely coiled wire springs, and which have the necessary degree of inherent longitudinal elasticity, may be used in some cords instead of the rubber strand, although the latter is far more satisfactory for most purposes.

This application is a continuation in part, of each of my copending applications Serial Nos. 573,783 and 645,220, filed November 9, 1931 and December 1, 1932, respectively, and combines the entire subject matter of these prior applications; Figs. 1 to 6 inclusive of this application being substantial duplicates of Figs. 1 to 6 of Serial No. 645,220, filed December 1, 1932, and Figs. 7, 8, 9 and 10 of this application being substantial duplicates of Figs. 4, 2, 5, and 6, of Serial No. 573,783, filed Nov. 9, 1931.

Having thus described my invention, what I desire to claim as new is:

1. A self-contracting cord including, within the structure thereof, an elastic strand extending longitudinally of the cord and displaced throughout the greater part of its length from the neutral axis of bending of the cord, said elastic strand being longitudinally tensioned so that its tendency to contract longitudinally serves to hold the cord, including said elastic strand, normally in a contracted and looped condition.

2. A self-contracting cord including, within the structure thereof, an elastic strand extending longitudinally of the cord and displaced throughout the greater part of its length from the neutral axis of bending of the cord, said strand being shifted at intervals from one side to the other of said axis, and being so tensioned that its tendency to contract longitudinally serves to hold the cord normally in a contracted and folded condition.

3. A self-contracting cord including, within the structure thereof, an elastic strand extending longitudinally of the cord and displaced throughout the greater part of its length from the neutral axis of bending of the cord, said elastic strand being longitudinally tensioned so that its tendency to contract longitudinally serves to hold the cord including said elastic strand, normally in a contracted and looped condition, and means forming part of the structure of said cord for limiting the degree to which the cord can be bent by said elastic strand.

4. A self-contracting cord including, within the structure thereof, an elastic strand extending longitudinally of the cord and displaced throughout the greater part of its length from the neutral axis of bending of the cord, said elastic strand being longitudinally tensioned so that its tendency to contract longitudinally serves to hold the cord including said elastic strand, normally in a contracted and looped condition, said strand having a cover wound thereon and serving to limit the degree to which it can contract.

5. A self-contracting cord comprising a flexible core, a tensioned elastic strand lying beside and closely adjacent to said core but displaced from the neutral axis of bending of the cord, and a flexible jacket closely enclosing said core and said strand.

6. A self-contracting cord comprising a flexible core, an elastic strand lying beside and closely adjacent to said core but displaced from the neutral axis of bending of the cord, said strand being so tensioned that its tendency to contract longitudinally serves to hold the cord normally in a contracted and looped condition, and a flexible jacket closely enclosing said core and said strand, said jacket and core being adhesively bonded to each other.

7. A self-contracting cord including, within the structure thereof, a tensioned elastic strand extending longitudinally of the cord, means for holding said strand displaced from the neutral axis of bending of the cord but in an approximately constant and predetermined spaced relationship to said axis, whereby said strand, when allowed to contract, serves to make approximately uniform loops in said cord.

8. A self-contracting cord comprising a stranded core, a tensioned elastic strand extending along said core closely beside it but displaced from the neutral axis of bending of the cord, said strand extending transversely through said core from one side thereof to the other at substantially regular intervals, whereby the contraction of said strand due to its inherent elasticity serves to hold the cord normally in a contracted and folded condition, and a flexible jacket closely enclosing said core and said strand.

9. An article of the character described, comprising a flexible conductor, a tensioned elastic cord lying beside and closely adjacent to said conductor but displaced from the neutral axis of bending of the conductor, and a flexible cover closely enclosing said conductor and said cord.

10. A cord of the character described, comprising a flexible conductor, an elastic strand longitudinally tensioned when extended, extending along and closely beside said conductor in a generally parallel relationship thereto but displaced from the neutral axis of bending of said conductor, and serving normally to hold said conductor in a looped condition, and means for fastening said strand and said conductor together to hold them constantly in said generally parallel relationship to each other, said strand being arranged to be tensioned by the act of straightening said conductor.

11. A cord of the character described, comprising a flexible conductor, a tensioned elastic strand, longitudinally tensioned when extended, lying closely beside said conductor throughout the length of said strand in a position displaced by approximately a predetermined distance from the neutral axis of bending of the conductor, and means for constantly holding said strand and said conductor in said spaced relationship notwithstanding the expansion and contraction of said strand.

12. An article of the character described, comprising a flexible conductor, a tensioned elastic strand, longitudinally tensioned when extended, operatively associated with said conductor, and means for holding said strand constantly displaced from the neutral axis of bending of the conductor but in an approximately constant and predetermined spaced relationship to said conductor, whereby said strand, when allowed to contract, serves to make approximately uniform loops in said conductor.

13. An article of the character described, comprising a flexible conductor, a tensioned elastic strand serving to loop said conductor, and a flexible jacket enclosing said conductor and strand, said jacket carrying an impregnating medium serving to limit the degree to which the conductor will be bent by said strand.

14. A cord of the character described, comprising a flexible core, a tensioned elastic strand extending along said core and spaced therefrom by approximately a uniform distance throughout the greater part of said cord, said strand being tensioned longitudinally when extended, and means for fastening said strand and said core together to hold them constantly in said spaced relationship, said strand being located at one side of the neutral axis of bending of said core through one section of the cord and thereby tending to hold the cord in a coiled condition and being reversed with reference to the core at an intermediate point in the cord, whereby it tends to hold an adjacent section of the cord in a reversely coiled condition.

15. A cord of the character described, comprising a flexible core, an elastic strand extending along and closely beside said core in a generally parallel relationship thereto but so displaced from the neutral axis of bending of said cord as to hold the cord normally in a coiled condition with adjacent turns of the coil close to each other, said strand being tensioned longitudinally when extended, means for fastening said strand and said core together to hold them constantly in said generally parallel relationship to each other, said strand being arranged to be tensioned by the act of straightening the cord but serving to return the cord again to its coiled condition when released, and part of said cord being coiled in one direction and an adjacent part in the opposite direction.

16. A cord of the character described, comprising a flexible core, an elastic strand extending along and closely beside said core in a generally parallel relationship thereto but so displaced from the neutral axis of bending of said core as to hold the cord normally in a helically coiled condition with adjacent turns of the coil close to each other, said strand being tensioned longitudinally when extended, means for fastening said strand and said core together to hold them constantly in said generally parallel relationship to each other, said strand being arranged to be tensioned by the act of straightening the cord but serving to return the cord again to its coiled condition when released, and part of said cord being coiled in one direction and an adjacent part in the opposite direction, the strand being so displaced from said axis between said sections as to form a node which revolves around the axis of the coil when the cord is stretched.

17. That improvement in methods of making cordage which consists in associating a tensioned and elongated elastic strand capable of longitudinally extension and contraction with flexible stranded material to form a cord, and so controlling the position of said elastic strand in the cord so produced as to maintain said strand in a spaced relationship to the neutral axis of bending of the cord throughout a large part of the cord, whereby said tensioned strand serves, when allowed to contract, to bend said cord, including said elastic strand, into a looped condition.

18. That improvement in methods of making cordage which consists in associating a tensioned and elongated elastic strand capable of longitudinal extension and contraction with flexible stranded material to form a cord, and binding said strand and said material together to hold them in an approximately constant relationship to each other with said elastic strand so displaced from the neutral axis of bending of the cord as to cause said tensioned strand, when allowed to contract, to bend said cord into a looped condition.

19. That improvement in methods of making cordage which consists in bringing together a stranded, flexible core and a tensioned and elongated elastic strand capable of longitudinal extension and contraction with the latter extending along and closely beside the former, shifting said strand at approximately regular intervals from one side of said core to the other, and binding said elements together in said relationship with approximately uniform lengths of said strand located on opposite sides of said core.

20. That improvement in methods of making cordage which consists in bringing together a stranded, flexible core and a tensioned and elongated elastic strand capable of longitudinal extension and contraction with the latter extending along and closely beside the former, shifting said strand at approximately regular intervals from one side of said core to the other, binding said elements together in said relationship with approximately uniform lengths of said strand located on opposite sides of said core, and closely enclosing both of said elements in a flexible jacket.

21. That improvement in methods of making self-looping cords, which consists in operatively associating a flexible conductor with a tensioned and elongated elastic strand capable of longitudinal extension and contraction, with the strand extending along the conductor closely adjacent thereto and uniformly spaced therefrom throughout the greater part of said cord but displaced from the neutral axis of bending of the cord, and fastening said strand and said conductor together to hold them constantly in said spaced relationship.

22. That improvement in methods of making self-folding electric conductors, which consists in binding an elastic cord while in a tensioned and elongated condition to a plurality of flexible wires, and shifting said elastic cord at intervals spaced along said wires from one side of the wires to the other, whereby the contracting tendency of the cord will serve to hold the wires normally in a folded condition.

23. That improvement in methods of making self-folding electric conductors, which consists in binding an elastic cord while in a tensioned and elongated condition to a plurality of flexible wires, shifting said elastic cord at intervals spaced along said wires from one side of the wires to the other, whereby the contracting tendency of the cord will serve to hold the wires normally in a folded condition, and covering said wires and cord with a flexible jacket closely enclosing said wires and cord.

24. That improvement in methods of making cordage which consists in bringing together a stranded, flexible core and a tensioned and elongated elastic strand, capable of longitudinal extension and contraction, with the latter extending along and closely beside the former but displaced from the neutral axis of bending of the cord throughout the greater part of the cord, and fabricating a flexible jacket closely around both of said elements to hold them in an approximately fixed relationship to each other with said strand so displaced from said axis.

25. That improvement in methods of making cordage which consists in bringing together a stranded, flexible core and a tensioned and elongated elastic strand, capable of longitudinal extension and contraction, with the latter extending along and closely beside the former but displaced from the neutral axis of bending of the cord throughout the greater part of the cord, braiding a flexible jacket around both of said elements to hold them in an approximately fixed relationship to each other with said strand so displaced from said axis, and impregnating the core with an adhesive agent immediately prior to the braiding operation whereby the core and jacket will be adhesively bonded to each other.

26. That improvement in methods of making cordage which consists in bringing together a stranded, flexible core and a tensioned and elongated elastic strand, capable of longitudinal extension and contraction, with the latter extending along and closely beside the former but displaced from the neutral axis of bending of the cord throughout the greater part of the cord, binding said elements together with a flexible binder to hold said strand so displaced, and subsequently braiding a jacket closely around both of said elements.

27. A self-folding electric conductor, comprising a plurality of flexible wires, a tensioned elastic cord lying beside and closely adjacent to said wires, first at one side of the wires and then at the other, said cord being crossed back and forth from one side of said wires to the other at regularly spaced intervals, and means for securing the said wires and cord in said relationship.

28. A self-folding electric conductor, comprising two flexible wires, a tensioned rubber strand lying beside and closely adjacent to said wires, first at one side of the wires and then at the other, said strand being crossed back and forth between said wires at regularly spaced intervals, means for binding said strand to the wires at the points of crossing, and a flexible jacket closely enclosing said wires and strand.

KENNETH R. SHAW.